(12) United States Patent
Kato (10) Patent No.: US 6,751,088 B2
(45) Date of Patent: Jun. 15, 2004

(54) METHOD FOR SELECTING SOFTWARE IN ELECTRONIC DEVICE

(75) Inventor: Shoji Kato, Musashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 10/132,177

(22) Filed: Apr. 26, 2002

(65) Prior Publication Data

US 2002/0193081 A1 Dec. 19, 2002

(30) Foreign Application Priority Data

Apr. 27, 2001 (JP) .................................. 2001-133293

(51) Int. Cl.[7] .............................................. H05K 5/00
(52) U.S. Cl. .................. 361/679; 713/323; 700/17; 455/90
(58) Field of Search ................. 361/679, 455, 361/680–687, 724–727; 713/323; 717/120–123; 700/17, 83; 345/700

(56) References Cited

U.S. PATENT DOCUMENTS 6,023,147 A * 2/2000 Cargin et al. ................ 320/114
6,597,924 B1 * 7/2003 Smith .......................... 455/557
6,681,124 B2 * 1/2004 Prior et al. .................. 455/563

* cited by examiner

*Primary Examiner*—Hung Van Duong
(74) *Attorney, Agent, or Firm*—Finnegan, Henderson, Farabow, Garrett & Dunner, L.L.P.

(57) ABSTRACT

A software-selecting method is for use in an electronic device equipped with a plurality of software components and a selecting section which selects one of the software components. The method comprises selecting one of the software components if one of first and second electronic device housings is attached to the electronic device. The first electronic device housing has an operating portion which operates the selecting section. The second electronic device housing has no operating portion.

9 Claims, 5 Drawing Sheets

METHOD FOR SELECTING SOFTWARE IN ELECTRONIC DEVICE

CROSS-REFERENCE TO RELATED APPLICATIONS

This application is based upon and claims the benefit of priority from the prior Japanese Patent Application No. 2001-133293, filed Apr. 27, 2001, the entire contents of which are incorporated herein by reference.

BACKGROUND OF THE INVENTION

1. Field of the Invention

This invention relates to a method for selecting one of software components installed in an electronic device to which an electronic device housing is attached. In particular, the invention relates to a software selecting method for use in electronic devices, in which the software used needs to be changeable for different specifications. These electronic devices are, for example, cellular phones, PDAs (Personal Digital Assistants), etc.

2. Description of the Related Art

In electronic devices such as cellular phones, there is a case where specifications such as LCD (Liquid Crystal Display) contents or an incoming sound must be changed even if the types of cellular phones are same. The determining factors here are the destination environment where the devices are to be used, and the provider who provides services to users by the device. Where different providers handle the same model produced by a single maker, the specifications may need to be changed. Specifically, it may be necessary to change, in a single electronic device model, basic operation modes such as a "Wake-Up" display, incoming sound and backlight color, etc., according to certain specifications.

Thus, it is convenient to provide electronic devices with different operation modes for destinations or for communication providers to which electronic devices are sold. To impart different operation modes, a method for installing different software in a single hardware platform is generally employed.

Figure 9:
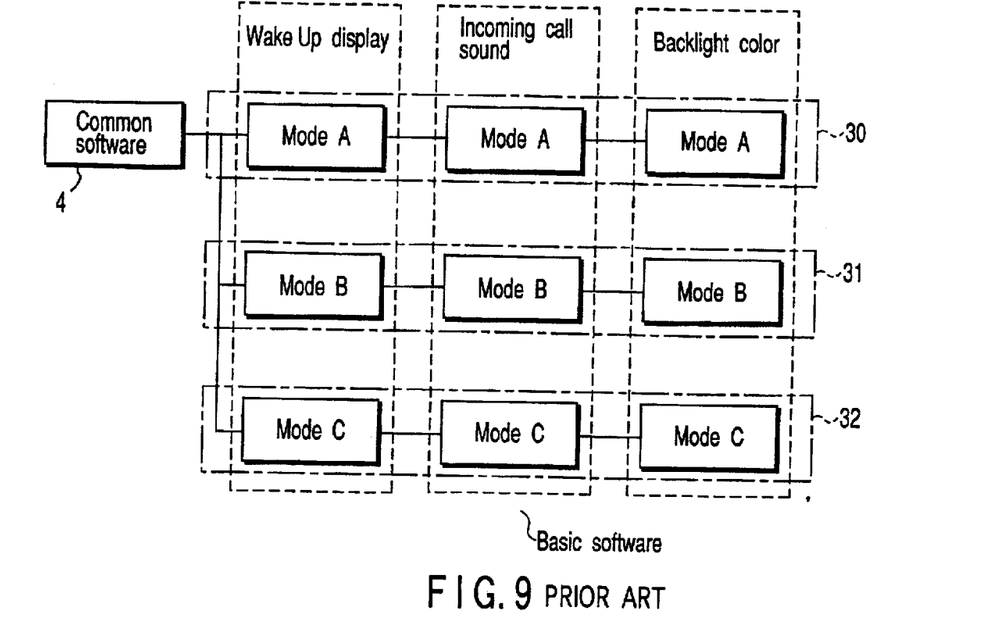
FIG. 9 is a conceptional view illustrating the structure of software for use in a conventional electronic device.

FIG. 9 schematically shows the structure of basic software used for the above-described purpose. This software comprises common software 4 and software components 30, 31 and 32 that are different from each other. The common software 4 executes basic functional control, such as the control of a built-in battery, and is commonly used to realize each of the modes shown in FIG. 9. The software components 30, 31 and 32 realize operation modes A, B and C, respectively.

Figure 10:
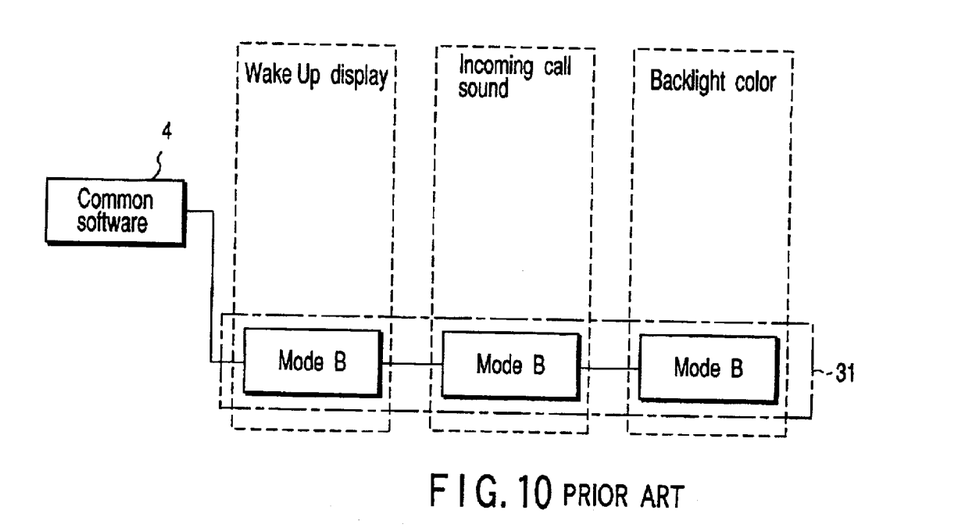
FIG. 10 is a conceptual view illustrating a software structure assumed when a mode B operation shown in FIG. 9 is selected.

The software corresponding to each specification can be determined by selecting components of basic software shown in FIG. 9. FIG. 10 shows a software structure realized when the mode B has been selected.

Which software component is selected is determined at the manufacturing stage of each cellular phone. Specifically, an ID number corresponding to the specification of each model of electronic devices is prepared and designated when software is written into, for example, a ROM (Read Only Memory), thereby selecting one of the software components. This makes it complicated to manage ID numbers for respective models at the manufacturing stage, and hence degrades productivity, for example.

As described above, in electronic devices such as cellular phones, different operation modes are realized for each model by installing the modes with different control software. In conventional electronic devices, software corresponding to the specification of each model is written to each electronic device in relation to the ID number of the electronic device during manufacture. This makes it complicated to manage ID numbers for respective models at the manufacturing stage, and hence degrades productivity. In particular, when electronic devices of different specifications are manufactured in parallel, this further complicates manufacturing procedures. Another problem may arise in manufacture, the problem being that the housing of an electronic device is not matched with software installed therein.

BRIEF SUMMARY OF THE INVENTION

The present invention has been developed in light of the above, and aims to provide a software selecting method for use in an electronic device, which can prevent mismatch of the type of housing of the electronic device and software installed therein, thereby facilitating the management of software installed in the electronic device during its manufacture.

To satisfy the aim, the present invention provides a software-selecting method for use in an electronic device equipped with a plurality of software components and a selecting section which selects one of the software components, comprising:

selecting one of the software components if one of first and second electronic device housings is attached to the electronic device, the first electronic device housing having an operating portion which operates the selecting section, and the second electronic device housing having no operating portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the invention will be described in detail with reference to the accompanying drawings.

Figure 1:
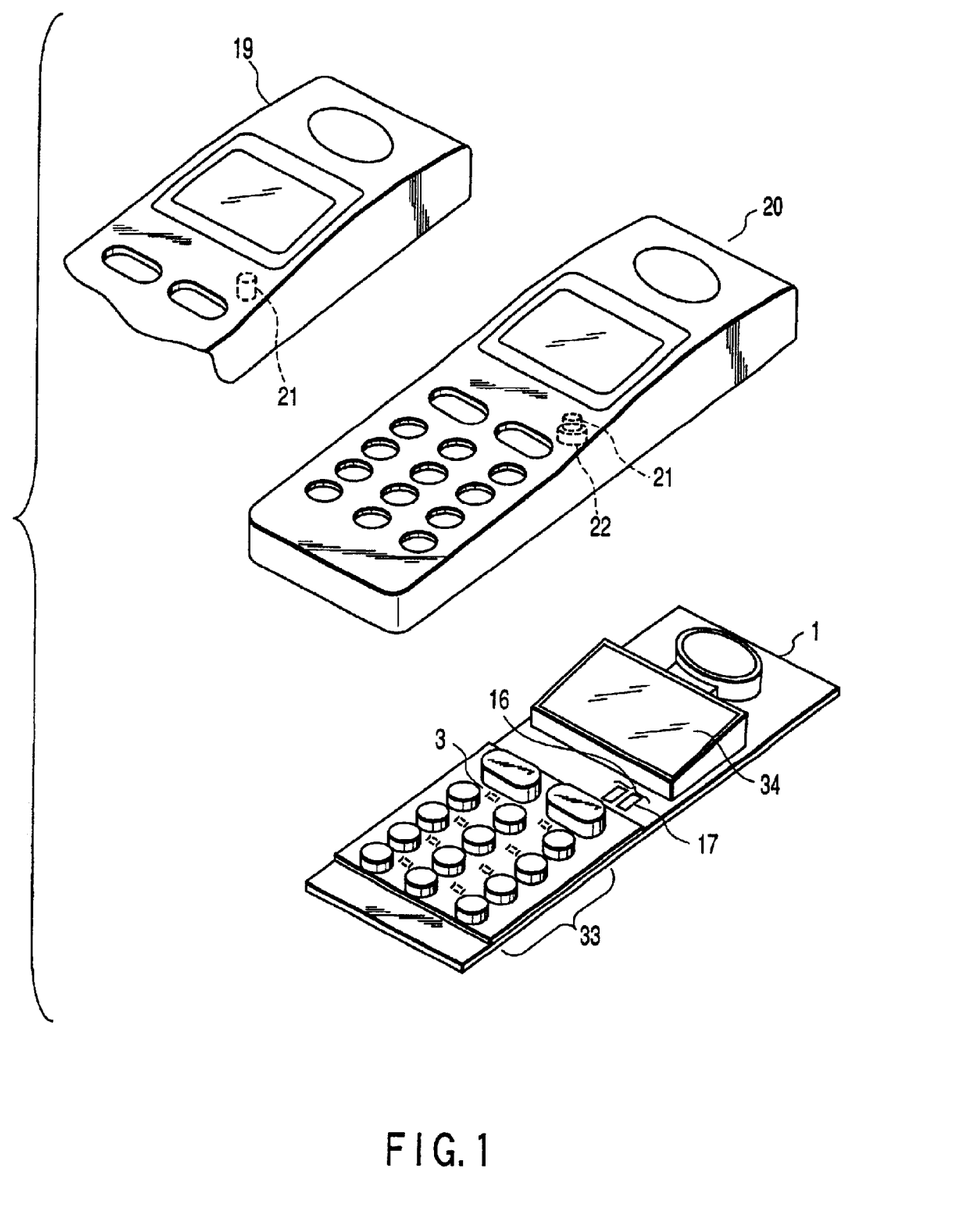
FIG. 1 is an exploded perspective view illustrating a cellular phone according to an embodiment of the invention.

FIG. 1 is an exploded perspective view illustrating a cellular phone according to an embodiment of the invention. The cellular phone shown in FIG. 1 comprises a control board 1, and a standard housing 19 or optional housing 20 which is to be attached to the board 1. The phone further comprises another housing, namely a reverse-side electronic device housing, which sandwiches the control board 1 together with the front housing 19 or 20.

A pair of isolated stationary contacts 17 are provided on the control board 1. A conductive rubber 22 is provided on a projection 21 that is formed on the inner surface of the optional housing 20, together with the stationary contacts 17 which form a switch section 16. When the conductive rubber 22 short-circuits the stationary contacts 17, the switch section 16 is turned on. Thus, the switch section 16 is in the ON state when the stationary contacts 17 are short-circuited by the conductive rubber 22, and is in the OFF state when the stationary contacts 17 are isolated respectively. LEDs (Light Emitting Diodes) 3 for illuminating an input key section 33 are mounted on the control board 1. An LED (not shown) serving as a backlight for illuminating a display 34, such as an LCD, is also mounted on the board 1. The LEDs 3 are of a multi-color emission type that can selectively emit light beams of at least two colors, such as red and green.

The standard and optional housings 19 and 20 are formed using a common mold, and hence have the same shape and size. The housings 19 and 20 may be differently colored, for example, in gray and red, respectively, so as to discriminate the housings 19 and 20.

A projection 21 is provided on the inner surface of each of the standard and optional housings 19 and 20 at a location corresponding to the stationary contacts 17. When the standard or optional housing 19 or 20 is attached to the control board 1, the projection 21 is opposed to the stationary contacts 17.

A conductive rubber 22 is attached to the projection 21 of the optional housing 20. When the optional housing 20 is attached to the control board 1, the conductive rubber 22 short-circuits the stationary contacts 17 to thereby turn on the switch section 16.

Figure 2:
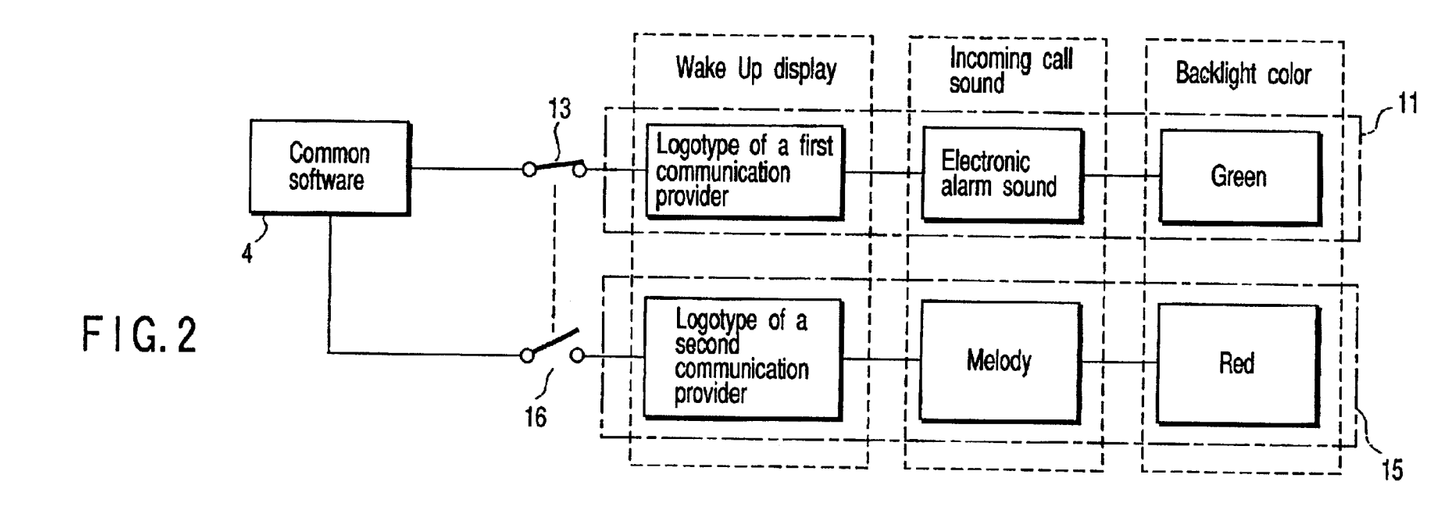
FIG. 2 is a conceptual view illustrating the structure of software installed in the cellular phone shown in FIG. 1.

FIG. 2 is a conceptual view illustrating the configuration of the software installed in the cellular phone shown in FIG. 1. This software comprises common software 4, standard software 11 and optional software 15. In the operation mode of the standard software 11, specifications directed to a first communication provider are assumed. That is, the logotype of the provider is used as the Wake-Up display, an electronic alarm sound as the incoming call sound, and green as the backlight color. Further, in the operation mode of the optional software 15, specifications directed to a second communication provider differing from the first provider are assumed. That is, the logotype of the second provider is used as the Wake-Up display, a melody as the incoming call sound, and red as the backlight color.

The basic software of FIG. 2 is pre-written to a ROM (not shown) incorporated in the control board 1 of FIG. 1.

One of the standard software 11 and optional software 15 is selected in accordance with the state of the switch sections 13 and 16. Specifically, the standard software 11 and optional software 15 are written to different ROMs or different areas of a ROM, and a CPU (Central Processing Unit) for total control of the cellular phone is selectively connected to one of the ROMs in accordance with the ON/OFF states of the switch sections 13 and 16. As a result, one of the software components 11 and 15 is selected. Alternatively, a BIOS (Basic Input Output System), which is activated when the cellular phone is turned on, reads software from one of the ROMs in accordance with the states of the switch sections 13 and 16, thereby selecting one of the software components 11 and 15.

In the default state, the switch section 16 is in the OFF state, and a switch section 13 is in the ON state. In the default state, the standard software 11 is connected to the common software and operates. On the other hand, when the switch section 16 is turned on, the switch section 13 is accordingly turned off, thereby switching the software to the optional software 15.

The software structure may be modified such that when the switch section 16 is in the ON state, the standard software 11 operates in the background, and the user can use only the functions realized by the optional software 15. In other words, the software structure may be modified such that both the standard software 11 and optional software 15 are loaded in a main memory (not shown) provided on the control board 1, and the user can use only an operation executed by the optional software 15.

Figure 3:
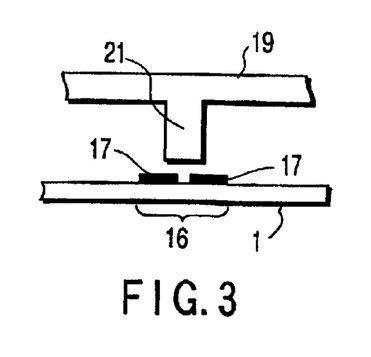
FIG. 3 is a view illustrating the state of a switch section assumed when a standard housing is attached to a control board shown in FIG. 1.

FIG. 3 is a view illustrating the state of the switch section 16 assumed when the standard housing 19 is attached to the control board 1. In the standard housing 19, no conductive rubber is attached to the projection 21. Accordingly, even if the standard housing 19 is attached to the control board 1, the stationary contacts 17 are maintained open. That is, the switch section 16 is in the OFF state, and the standard software 11 operates in the control board 1, thereby realizing an operation mode corresponding to the specifications directed to the first communication provider.

Figure 4:
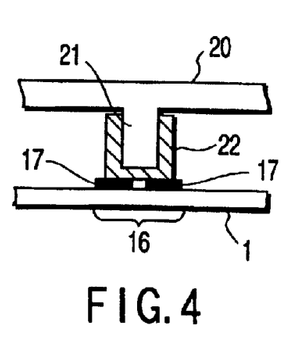
FIG. 4 is a view illustrating the state of the switch section assumed when an optional housing is attached to the control board shown in FIG. 1.

FIG. 4 is a view illustrating the state of the switch section 16 assumed when the optional housing 20 is attached to the control board 1. The conductive rubber 22 is attached to the projection 21 of the optional housing 20. Accordingly, when the optional housing 20 is attached to the control board 1, the stationary contacts 17 are short-circuited, thereby turning on the switch section 16.

Figure 5:
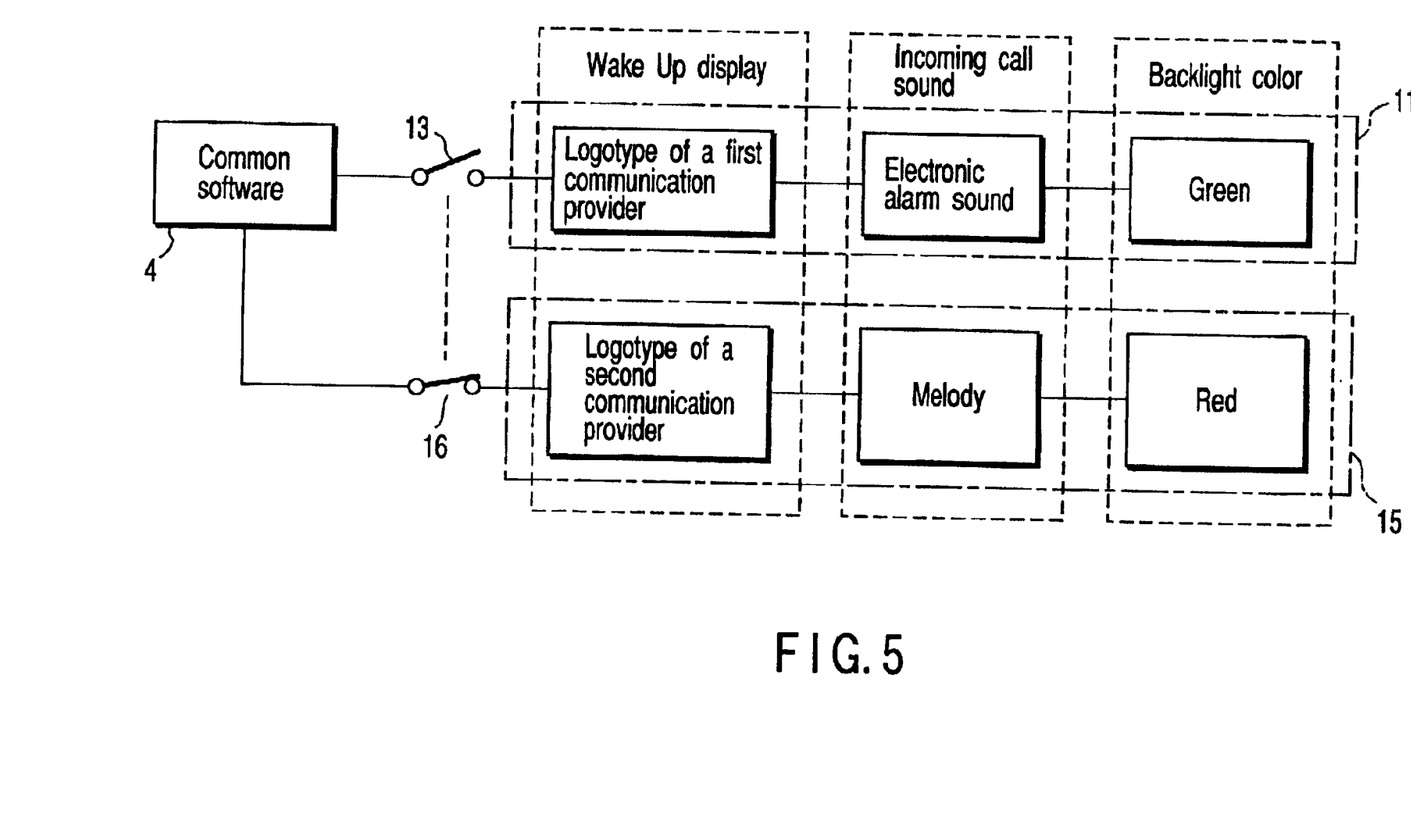
FIG. 5 is a conceptional view illustrating the software operable when the switch section is in the ON state in the cellular phone of FIG. 1.

FIG. 5 is a conceptual view illustrating the software operable when the switch section 16 is in the ON state. In this state, the common software 4 is logically disconnected from the standard software 11 but connected to the optional software 15. As a result, in the control board 1, the optional software 15 operates and realizes an operation mode corresponding to the specifications for the second communication provider.

As described above, the electronic device, i.e. the cellular phone, according to the embodiment, employs the standard housing 19 and optional housing 20 for different specifications. Each of the housings has the projection 21 at a location to oppose the switch section 16 when each of the housings is attached to the control board 1. The conductive rubber 22 is attached to the projection 21 of the optional housing 20. When the optional housing 20 is attached to the control board 1, the conductive rubber 22 abuts against the switch section 16 to thereby turn the switch section 16 on. On the other hand, when the standard housing 19 is attached to the control board 1, the switch section 16 is kept off. The control board 1 has basic software installed, which includes software for realizing an operation corresponding to the specifications for each provider, thereby enabling a software function corresponding to the specifications for each provider to be executed in accordance with the state of the switch section 16.

By virtue of this structure, the software that controls the control board 1 is switched in accordance with the specifications for each provider by switching the housings. In other words, the specifications can be switched simply by changing the housings. This means that the time and effort required to change the specifications can be significantly reduced as compared to the conventional case, thereby facilitating software management and preventing manufacturing errors.

Further, the cellular phone of the embodiment is shipped from a maker in the form of, for example, a common main body (including the control board 1) with a housing corresponding to the specifications for each provider. When shipping a standard device set, the standard housing 19 is attached to the device. When shipping a optional device set, the optional housing 20 is attached to the device. Thus, it is sufficient if the housing to attach is changed in accordance with the specifications. Therefore, it is not necessary to manage an ID number assigned to the specifications for each provider, and the time and effort required to manage the ID number is significantly reduced. Accordingly, the manufacturing process can be facilitated and hence the productivity is enhanced. This is very convenient to the makers and also enables the possibility of manufacturing errors to be much reduced.

Furthermore, in the embodiment, the standard housing 19 and optional housing 20 are made using a common mold. The standard housing 19 and optical housing 20 are integrated with the respective projections 21. The conductive rubber 22 is attached to the optional housing 20 at a later stage to thereby discriminate the housing 20 from the housing 19. Thus, it is not necessary to prepare two molds for the two housings, which further enhances the productivity.

The present invention is not limited to the above-described embodiment.

In the above embodiment, software is switched in accordance with the state of the switch section. This structure may cause the function of the device to completely differ before and after the switching. Instead of this structure, an optional function may be added to a standard function.

In this case, for example, the standard software 11 alone functions when the switch section 16 is off, while both the standard software 11 and optional software 15 function when the switch section 16 is on. In this case, the function change is executed such that the functions of the device are expanded, and the device is controlled by both the software components.

This structure is useful when, for example, a hidden function is called out. Specifically, an operation mode for displaying, as the Wake-Up display, a particular proprietary animation character is hidden, and is used to display the character as the Wake-Up display when an electronic device housing dedicated to the display of the proprietary character is attached to the main body of the device. At this time, the function may be contrived to use the theme song for the character as the incoming call sound. This may allow faster familiarization of cellular phones for children, and may allow the owner of the copyright of the character to develop a new market.

Although the embodiment employs one switch section 16, another embodiment may employ a plurality of switch sections.

Figure 6:
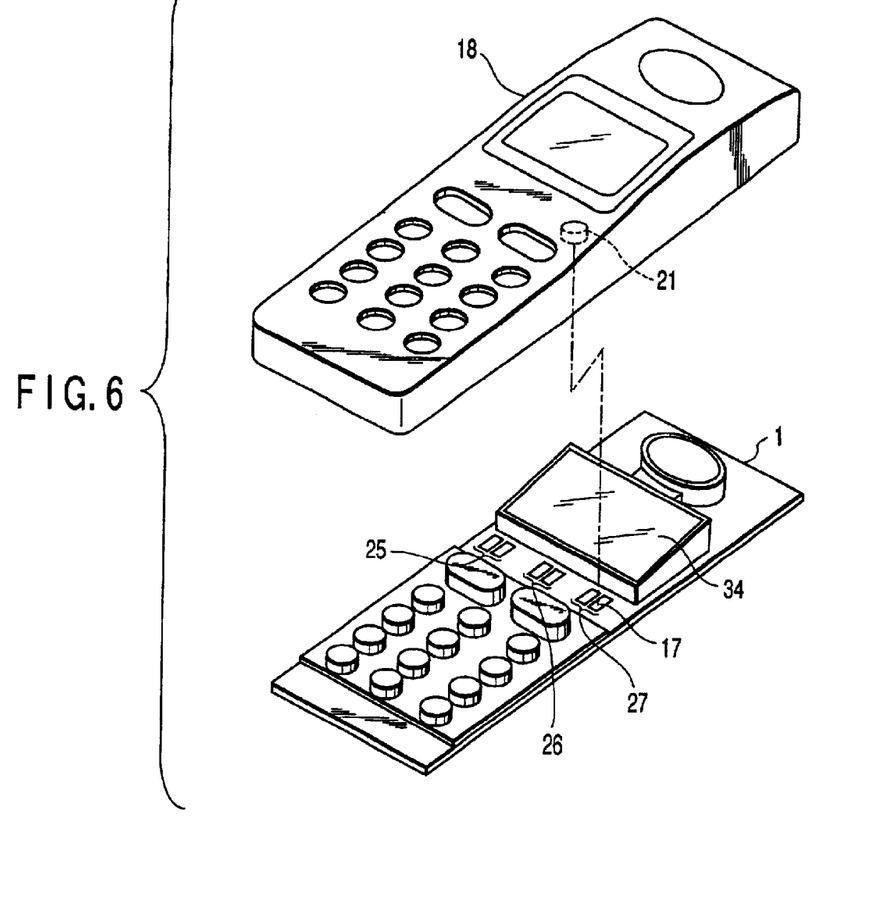
FIG. 6 is an exploded perspective view illustrating a cellular phone provided with a plurality of switch sections according to another embodiment of the invention.

FIG. 6 is a view illustrating a cellular phone provided with a plurality of switch sections according to another embodiment of the invention. As shown, this cellular phone comprises switch sections SW1 (25), SW2 (26) and SW3 (27) provided on the control board 1. One of the switches is turned on by the projection 21 formed on the inner surface of an electronic device housing 18. In FIG. 6, the switch section SW3 is to be turned on. This structure can provide the same advantage as the above.

Since the structure of FIG. 6 includes a plurality of switch sections 25, 26 and 27, a plurality of operations can be executed by combining the ON/OFF states of these switch sections 25, 26 and 27. For example, the structure of FIG. 6 has three switch sections 25, 26 and 27, each of which can discriminate states of 1 bit (i.e., two states). Accordingly, states of three bits in total, i.e., eight states, can be discriminated, which enables different function modes to be created.

The structure of the switch section is not limited to the above.

Figure 7:
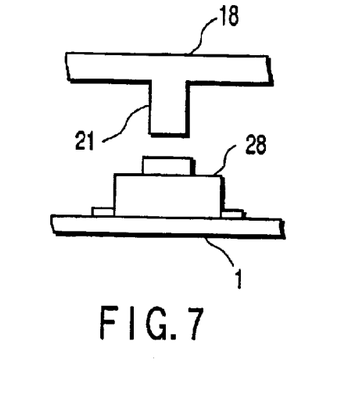
FIG. 7 is a sectional view illustrating a switch section of another structure.

FIG. 7 is a view illustrating a switch section of another structure. As shown, the switch section is formed of a push-button-type switch 28 provided on the control board 1. The push-button-type switch 28 is turned on if the switch 28 is pressed. On the other hand, the switch 28 is turned off if the switch 28 is not pressed. The switch 28 has a to-be-pressed portion. When this to-be-pressed portion has been pressed by the projection 21 of the housing 18, the switch 28 is turned on.

Figure 8:
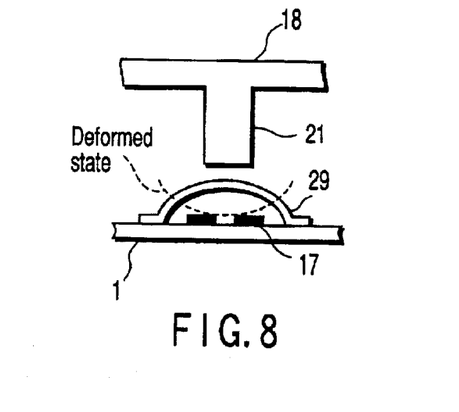
FIG. 8 is a sectional view illustrating a switch section of yet another structure.

FIG. 8 shows another switch section. As shown, the switch section is formed by covering a pair of stationary contacts 17 with an elastic metal dome 29. When the projection 21 has pressed the metal dome 29, the dome 29 is deformed, as indicated by the broken line, to thereby short-circuit the stationary contacts 17. As a result, the switch section is turned on. Since this structure is identical to that of each key of an input key section 33 shown in FIG. 1, this structure is advantageous for mass production.

Instead of the above-described contact-type switch, a non-contact-type switch using, for example, magnetic force may be used. This type of switch may be a reed switch provided with a contact made of a magnetic material. When a magnet is brought close to the contact, the magnet attracts and touches the contact, whereby the switch is turned on. If the reed switch is used, it is necessary to attach a small magnet to the housing 18.

Furthermore, in this embodiment, the switch of the control board 1 is turned on and off by the projection 21 provided on the inner surface of the housing. In place of this structure, openings for exposing in opposition to the switch section may be formed in the inner surface of the housing, and a chip with a projection may be fitted into the opening to fill one of the openings. In other words, in this case, the same housing may be used for different specifications, a chip being fitted into one of the openings for specifications.

Although in the embodiment, the invention is applied to a cellular phone, the invention is also applicable to other electronic devices. It is sufficient if the electronic device housing that covers the control board is detachable. PDAs and portable electronic games are included in such electronic devices.

However, there is an outstanding demand for the display, as the Wake-Up display, of different logotypes for different providers, in particular, in the field of mobile communications. This is because, in this field, the makers of the devices differ from the carrier providers that sell the devices. The advantage of the present invention is conspicuous for providers that use system infrastructures similar to those used in mobile communications.

The gist of the present invention can also be realized by an electronic device that comprises a main body operable in different modes, with an electronic device housing detachably attached to the main body and having a mark indicative of its operation mode, an operation-mode select/control means for identifying the electronic device housing on the basis of the mark, and a main body that operates in accordance with the operation mode of the attached housing.

The operation-mode select/control means is formed of, for example, high-order software such as a BIOS, which selects low-order software used to control the main body, on the basis of a signal output from hardware such as a switch for detecting the mark that is formed, for example, as a projection. The operation-mode select/control means changes the software that operates the main body in accordance with the electronic device housing attached thereto, thereby changing the specifications for the main body. Thus, the specifications can be easily changed, enhancing the convenience of the electronic device.

The operation mode and/or the structure of the switch section may be modified without departing from the scope of the present invention.

By virtue of this structure, the software used to control the main body of the electronic device is switched in accordance with the type of electronic device housing attached to the main body. Accordingly, electronic device housings corresponding to required specifications are prepared, and the software required can be easily set simply by changing the housings. In other words, the operation mode can be changed simply by changing the housings, which greatly facilitates the manufacture of the electronic device. In particular, the Wake-Up display can be changed simply by changing the housings.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device equipped with a control board, the electronic device comprising:

a switch unit configured to be set on the control board;

a memory which stores a first software component which is used if the switch unit is in an ON state;

a first housing which includes an operating portion which operates the switch unit to be in the ON state if the first housing is attached to the control board, the operating portion setting the switch to be in the ON state during a period that the first housing is attached to the control board; and a CPU which read the first software component from the memory and executes the first software component if the first housing is attached to the control board and if the switch unit is in the ON state.

2. The electronic device according to claim 1, wherein the switch unit connects the memory and the CPU such that the CPU reads the first software component from the memory if the switch unit is in the ON state.

3. The electronic device according to claim 1, wherein:

the switch unit includes a pair of isolated stationary contacts; and the operating portion includes a projection and a conductive rubber provided on the projection, the pair of isolated stationary contacts being connected by the conductive rubber and the switch being set to be in the ON state if the first housing is attached to the control board.

4. The electronic device according to claim 1, wherein:

the switch unit includes a pair of isolated stationary contacts and an elastic metal dome; and the operating portion includes a projection, the pair of isolated stationary contacts being connected by the elastic metal dome when pressed by the projection, the switch being set to be in the ON state if the first housing is attached to the control board.

5. An electronic device equipped with a control board which selectively attaches one of a first housing and a second housing, the electronic device comprising:

a switch unit configured to be set on the control board;

a first memory which stores a first software component;

a second memory which stores a second software component;

a CPU which reads the first software component from the first memory and executes the first software component if the first housing is attached to the control board and if the switch unit is in an ON state, and which reads the second software component from the second memory and executes the second software component if the second housing is attached to the control board and if the switch unit is in an OFF state; and an operating portion configured to set the switch to be in the ON state during a period that the first housing is attached to the control board.

6. The electronic device according to claim 5, wherein the switch unit connects the first memory and the CPU such that the CPU reads the first software component from the first memory if the switch unit is in the ON state.

7. The electronic device according to claim 5, wherein:

the switch unit includes a pair of isolated stationary contacts; and the operating portion includes a projection and a conductive rubber provided on the projection, the pair of isolated stationary contacts being connected by the conductive rubber and the switch being set to be in the ON state if the first housing is attached to the control board.

8. The electronic device according to claim 5, wherein:

the switch unit includes a pair of isolated stationary contacts and an elastic metal dome; and the operating portion includes a projection, the pair of isolated stationary contacts being connected by the elastic metal dome when pressed by the projection, the switch being set to be in the ON state if the first housing is attached to the control board.

9. An electronic device which selectively attaches one of a first housing and a second housing, the electronic device comprising:

a memory which stores a first software component and a second software component;

a detecting unit configured to detect whether or not the first housing is attached to the electronic device, and whether or not the second housing is attached to the electronic device; and a CPU which reads the first software component from the memory and executes the first software component if the detecting unit detects the first housing is attached to the electronic device, and which reads the second software component from the memory and executes the second software component if the detecting unit detects the second housing is attached to the electronic device.

* * * * *